(12) United States Patent
Donohue et al.

(10) Patent No.: US 12,715,060 B2
(45) Date of Patent: Aug. 25, 2026

(54) PROCESSOR FOR FLEXIBLE SCREEN FRAMES

(71) Applicant: Erdman Automation Corporation, Princeton, MN (US)

(72) Inventors: Morgan William Donohue, North Oaks, MN (US); Ryan Lloyd Henry Roberts, Isanti, MN (US); Larry Berning, Buffalo, MN (US); Dale James Hatch, Milaca, MN (US); Evan Garrett, Henderson, NV (US); Andrew Dean Peterson, Zimmerman, MN (US); Peter Joachim Kroll, Saint Stephen, MN (US)

(73) Assignee: Erdman Automation Corporation, Princeton, MN (US)

( * ) Notice: Subject to any disclaimer, the term of this patent is extended or adjusted under 35 U.S.C. 154(b) by 784 days.

(21) Appl. No.: 18/189,087

(22) Filed: Mar. 23, 2023

(65) Prior Publication Data

US 2024/0316682 A1 Sep. 26, 2024

(51) Int. Cl.
*B23K 11/00* (2006.01)
*B23K 37/003* (2025.01)
(Continued)

(52) U.S. Cl.
CPC .......... *B23K 11/008* (2013.01); *B23K 37/003* (2013.01); *B23K 37/0211* (2013.01);
(Continued)

(58) Field of Classification Search
CPC .. B23K 11/002; B23K 11/008; B23K 37/003; B23K 37/0211; B23K 37/04; B23K 37/08; B23K 2101/22; E06B 9/52
See application file for complete search history.

(56) References Cited

U.S. PATENT DOCUMENTS 7,572,299 B2 8/2009 Christensen
9,234,388 B2 1/2016 Altieri, Jr.
(Continued)

FOREIGN PATENT DOCUMENTS

CA 180236 S 11/2019
CA 180238 S 11/2019
(Continued)

OTHER PUBLICATIONS

T300 Edge, Hot Wedge Welding, https://www.weldmaster.com/t300-extreme-edge.

(Continued)

*Primary Examiner* — Elton K Wong
(74) *Attorney, Agent, or Firm* — DeWitt LLP

(57) ABSTRACT

A flexible screen frame processor including a loading position that presents loading screen frame supports at which a partially formed flexible screen frame is supportable by an upper perimeter of the partially formed flexible screen frame and an end stripping position including at least one polymer coating stripper. A following welding position includes a welder and screen frame supports that support ends of the screen frame coaxially aligned. A post welding cleaning position includes weld spatter and flash cleaners. An unloading position includes unloading screen frame supports at which a welded and post-weld cleaned flexible screen frame is supportable by an upper perimeter of the welded flexible screen frame.

18 Claims, 18 Drawing Sheets

(51) Int. Cl.

| | |
|---|---|
| ***B23K 37/02*** | (2006.01) |
| ***B23K 37/04*** | (2006.01) |
| ***B23K 37/08*** | (2006.01) |
| ***B23K 101/22*** | (2006.01) |

(52) U.S. Cl.

CPC .............. *B23K 37/04* (2013.01); *B23K 37/08* (2013.01); *B23K 2101/22* (2018.08)

(56) References Cited

U.S. PATENT DOCUMENTS

| | | | | |
|---|---|---|---|---|
| D757,299 | S | 5/2016 | Altieri, Jr. | |
| D794,830 | S | 8/2017 | Altieri, Jr. | |
| D850,652 | S | 6/2019 | Altieri, Jr. | |
| D961,803 | S | 8/2022 | Altieri, Jr. | |
| 2004/0099644 | A1* | 5/2004 | Allen | C21D 9/50 219/121.64 |
| 2016/0090780 | A1 | 3/2016 | Altieri, Jr. | |
| 2020/0232274 | A1 | 7/2020 | Altieri, Jr. | |
| 2022/0056760 | A1 | 2/2022 | Altieri, Jr. | |
| 2022/0298856 | A1* | 9/2022 | Altieri, Jr. | E06B 9/52 |

FOREIGN PATENT DOCUMENTS

| | | | |
|---|---|---|---|
| WO | WO2020150602 | A1 | 7/2020 |
| WO | WO 2020247951 | A1 | 12/2020 |
| WO | WO 2022183129 | A1 | 9/2022 |

OTHER PUBLICATIONS

T300 Shade, Hot Air Welding, Hot Wedge Welding, https://www.weldmaster.com/t300-extreme-shade.

* cited by examiner 30
32
34
172

30
32
152
116

PROCESSOR FOR FLEXIBLE SCREEN FRAMES

TECHNICAL FIELD

Embodiments of the invention relate generally to removable window and door screens. In particular, example embodiments of the invention relate to the manufacturing of removable window screens that include a flexible frame that is resilient and a flexible mesh material that is bonded to the flexible frame.

BACKGROUND

Fenestrations exist in buildings to permit ingress and egress, entry of fresh air and light. Screens have been used in these openings for many years to permit the entry and exit of air while excluding insects, debris, leaves and other undesired materials. Currently screens generally include a mesh material supported by a frame that holds the mesh material taut and facilitates insertion of the screen into the frame of a fenestration. For the purposes of this application, the term fenestration refers to any opening in the outside envelope of a building structure including but not limited windows and doors.

In many modern window screens a fiberglass mesh is supported in a frame. Other mesh materials commonly include nylon, polyester, bronze, stainless steel, aluminum, copper, brass and galvanized steel. Meshes made of fiberglass, nylon and polyester are generally quite flexible, while meshes that are made of stainless steel, aluminum, copper, brass and galvanized steel are relatively less flexible.

Screen frames are commonly made of rigid materials such as extruded aluminum, wood, steel or polymers. Occasionally, screens are made without a perimeter frame. In this case the screens are stretched taut over an opening often by a roller under spring tension.

More recently, other screen frames are made of flexible materials with resilient qualities. For example, some flexible screen frames are made from resilient steel that is coated with a polymer material. In many cases, the screen mesh is fused to the flexible screen frame by the application of heat which renders the polymer material of the screen frame, the screen mesh or both at least partially molten during the manufacturing of the screen. When the polymer material returns to its non-molten state the screen mesh is fused and strongly bound to the screen frame.

Such flexible screens are typically inserted into rigid fenestration frames by distorting the flexible window screen, generally by pushing inwardly on parallel rectilinear sides of the flexible window screen and then inserting the flexible window screen into grooves that surround the rigid fenestration frame on an inside of the fenestration frame. Similarly, flexible screens are generally removed by distorting the screen frame which then permits taking the screen frame out of the grooves. To facilitate this, the flexible screen frame is generally resiliently biased outwardly toward an approximately rectangular shape.

Currently, manufacturing of flexible window screen frames and flexible window screens is largely done by manual processes that are labor-intensive. These processes tend to be inefficient and time-consuming. Thus, rapid production of flexible screen frames and screens is not available.

Flexible screen frames are formed from spring metal such as spring steel that is bent to the shape of the screen and so that terminal ends of the metal material abut one another.

Generally, the abutting ends of the flexible screen frame are located away from corners of the frame. Usually the abutting ends of the are not at a center of a straight side of the screen frame but the joint is not precluded from being there. The spring material is coated with a polymer material such as polyvinylchloride (PVC) also referred to as vinyl. Other polymer material coatings are, of course, possible.

The abutting terminal ends of the shaped frame are welded to each other to form a closed geometric shape most commonly a rectangle or a square. Resistance welding is commonly used.

To facilitate the welding of the abutting ends of the frame, the polymer coating material must first be removed from the metal core material. Failure to remove the polymer material interferes with establishing electrical contact with the metal core of the frame material necessary for electrical welding and may result in contamination of any weld that is performed with the coating material present. Contaminated welds are often of inferior quality and may not hold up to the flexing encountered during insertion and removal of the flexible screen frame from a window or door structure.

Following welding of the abutted metal core ends it is good practice to clean the area of the weld to remove weld flash or spatter and possibly to mitigate any mushrooming of the abutted ends that may occur during the welding process.

It is also desirable to apply a new polymer coating over the stripped and welded area of the frame to mitigate corrosion and to facilitate adhesion of screen mesh in the area surrounding the weld. This is commonly accomplished by slipping a portion of heat shrink tube over the frame material prior to welding to join the abutting ends and moving the heat shrink material away from the portion to be welded until it is welded, cleaned and cooled. After the welding is performed, post weld cleaned and cooled the heat shrink tube is located to cover the previously stripped and welded portion and heat is applied to shrink it. The level of heat required to shrink the heat shrink tube is considerably less than that related to welding.

These processes are typically manually performed.

Accordingly, there is still room for improvement in the manufacturing of flexible window screens.

SUMMARY OF THE INVENTION

Example embodiments of the invention improve on many of the above discussed deficiencies of the prior art.

According to an example embodiment, the invention includes a supporting structure configured to support multiple screen frames suspended in multiple hanging positions adjacent to and approximately parallel to one another. The supporting structure may be constructed from, for example, square steel tubing. The supporting structure includes a rectangular upper portion and four vertical supporting legs as well as, optionally, a rectangular lower portion supporting the four vertical supporting legs.

The supporting structure includes a plurality of frame hanging positions by which screen frames are suspended along an upper edge thereof. According to an example embodiment, the frame hanging positions may include a loading position, a cleaning and stripping frame ends position, a resistance welding frame position, a cooling position, a post weld cleaning position, and an unloading position. Optionally further positions may include a displacing ends position, a placing shrink tube on screen frame position, a post weld coining or peening position, a positioning shrink tube over stripped portion position and heat shrinking position.

Each frame hanging position has a length equal to or slightly longer than the maximum horizontal length dimension of the largest flexible screen frame expected to be processed.

According to an example embodiment screen frames are supported at the loading and unloading position by magnets. This is effective because flexible screen frames are generally formed of steel. Magnets supporting the flexible screen frames can be permanent magnets or electromagnets. In the event that flexible screen frames to be processed are made of a nonmagnetic material the screen frames may be supported at each position by mechanical grippers.

A loading frame hanging position according to example embodiments of the invention includes a linear row of magnets to which flexible screen frames to be processed are removably coupled typically placed there by an operator. Prior to loading, the flexible screen frame is typically formed by bending a piece of screen frame material into a rectangular shape with the two ends of the screen frame material abutting approximately coaxially at some position along a top edge of the screen frame. The abutting position of the two ends is typically displaced some distance from the corners of the flexible screen frame. The loading position is also accessible by dynamic grippers that open to pass over the screen frame material and close to grip the screen frame material and that shuttle between positions on the supporting frame.

Magnetic holding of the flexible screen frame for loading has the advantage of being self-aligning. That is the frame tends to align with the magnets and thus align the ends automatically Further, magnetic supporting of the flexible screen frame eliminates potential pinch points that may cause injury to fingers of an operator. The loading end of the processor may include a light curtain which when broken by the operator temporarily disables mechanical portions of the processor thus further protecting the operator and mitigating the risk of injury. A similar light curtain may be utilized at the unloading end of the processor.

Shrink tube is typically placed on the frame manually and displaced away from the ends to be welded by an operator. The shrink tube section is displaced from the abutting ends of the screen frame material a distance sufficient so that it is not in the way of further processing and is not effected by the heat of welding.

A following displacing ends frame position may include, in an example embodiment, movable actuators to displace the two ends of the screen frame from axial alignment and to hold the 2 ends in the displaced positions so that they are no longer coaxially aligned.

Displacing the ends of the screen frame allows access to the screen frame ends to strip polymer coating material from the screen frame ends and to clean polymer from the frame prior to joining the ends by welding.

The cleaning and stripping ends position generally presents at least one, or in an example embodiment, two rotary cleaning stripping tools or other stripping tools. The cleaning stripping tools are configured to remove polymer coating material from the metal flexible screen frame material a sufficient distance from the ends so that the polymer coating is not significantly melted during the resistance welding process. It may be beneficial to introduce a flow of cold compressed air to cool the polymer during removal thereby preventing friction-based heating and melting of the polymer. Melting of the polymer makes it more difficult to remove cleanly by abrading the polymer. A vacuum device may also be used to remove fragments of polymer that are separated from the frame material. The vacuum device if present also facilitates cooling.

An end stripping and cleaning tool according to an example embodiment of the invention generally includes a stripping cup having a scoring portion and a plurality of polymer stripping members located internally to the cup.

The cup generally includes a cylindrical external structure perforated by a number of openings through which stripped plastic can exit the cup. The cup generally includes a distal end having a fixed diameter opening and a proximal end having an opening that can be reduced in size by a clamping member to secure it to a spindle. The proximal end opening can be structured to be reduced in diameter to grip the spindle or can for example be threaded to be secured on a threaded spindle. According to an example embodiment, the proximal end opening generally has a slot cut through in a radial direction and a bore through the structure generally perpendicular to the slot the bore is threaded on one slide of the slot and unthreaded on the other so that a bolt or other threaded fastener can be passed through the side and tightened to reduce the width of the slot thus clamping the proximal end the cup to a rotating spindle. Other approaches to securing the cup to the spindle may be utilized as well as known by those skilled in the art.

The scoring portion of the tool generally includes two or more structures secured to the distal end of the cup and extending across and inwardly into the distal opening. The scoring portion may include two or more structures formed of spring steel or another resilient hard material. The central portion of each of the two scoring structures may have a slightly concave shape. The concave shape facilitates centering of the screen frame material to be stripped. The scoring structures have sufficient resiliency to permit the insertion of the end of the flexible spring frame material therebetween. The resiliency and size of the gap between the stripping structures is sufficient for the scoring structures to tightly engage the material of the flexible spring frame so that when the cup is rotated the concave inner edge of the scoring structures penetrate the polymer coating of the frame material until the scoring structures abut the metal core of the screen material.

The interior of the cup further supports a plurality of inwardly extending abrading structures. The abrading structures may include for example a plurality of spring steel wires or rods. The spring steel wires or rods may be secured to the cup by clamping structures located in the openings in the wall of the cup. The clamping structures facilitate removal and replacement of the spring steel wires or rods when the structures become worn over time. The clamping structures may be secured for example by setscrews. Alternately, the spring steel wires or rods may be secured by setscrews in holes in the wall of the cup.

An end stripping and cleaning tool according to another example embodiment of the invention generally includes an inductive heating coil into which an end of the frame material is inserted and a polymer stripper including sharp jaws that grip the frame material end after inductive heating and retract from the frame end to strip the polymer coating from the frame end. The inductive heating coil heats the end of the material in a few seconds. Heating of the metal core of the frame material softens the polymer coating and facilitates stripping of the polymer coating by the jaws that grip the frame material and move from an inset position on the frame material end toward and beyond the terminus of the frame material thus leaving the end of the frame material devoid of the polymer coating for a desired distance.

A welding position includes a resistance welder that has two gripping structures that grip the terminal ends of the frame material and apply electrical current to the frame material to facilitate resistance welding of the abutted ends of the of the frame material. The gripping structures include at least one jaw that is electrically conductive and that is coupled to a source of welding current. The gripping structures are each further supported on movable assemblies that are capable of moving parallel to a long axis of the frame material to be welded to force the ends of the frame material into close contact and abutment following gripping of the frame material.

The resistance welder may include further nonconductive gripping structures on either side of the resistance welder to facilitate accurate coaxial alignment of the frame material at the joint. The resistance welder may be further supported on a movable mounting that moves the resistance welder vertically between a gripping and welding position and a retracted position in which the resistance welder does not interfere with further movement of the welded screen frame following welding. Movable jaws of the resistance welder are capable of rotating approximately 90° so that the jaws are well clear of the frame material during vertical movement of the resistance welder.

Once electrical contact and abutment of the frame material ends is achieved an appropriate electrical current is passed through the ends to heat them to the melting point of the steel material and to cause them to fuse together upon cooling. This can be accomplished by known principles and techniques of resistance welding by the application of known tools and mechanisms for resistance welding.

A post weld cooling position follows which may include a source of cooling air flow. For example, a vortex tube and a source of compressed air may be employed to direct a strong flow of cooling air over the welded portion of the frame.

The post weld cleaning and optional peening position follows. Post weld cleaning can be accomplished by, for example, use of a rotary wire brush, sanding or other abrasive treatment to remove weld spatter and flash. The cleaning of the weld also permits further time for the welded joint to cool. Post weld cleaning may also reduce or remove mushrooming of the joined terminal ends at the joint formed by resistance welding. The cleaning may be accomplished utilizing at least one belt sander to remove any excess weld flash, spatter and mushrooming. The belt sander may be configured so that the sanding belt at least partially wraps around the welded portion of the flexible screen frame material.

According to an example embodiment, one or a pair of belt sanders may be employed to remove weld spatter and mushrooming in the vicinity of the weld joint at the welded ends. Such a pair of belt sanders may employ multiple rollers upon which the sanding belt are supported. The multiple rollers and sanders may be movable to enable access to the entire perimeter of the welded portion of the screen frame so that well the flash, spatter and mushrooming may be removed or at least mitigated. At least one of the rollers can be at an end of the sanding belt such that the exposed portion of the sanding belt contacts approximately 180° sanding belt. According to an example embodiment, the belts sanders include a driven wheel and two idler wheels. One of the two idler wheels is biased against the sanding belt and thus also acts as a belt tensioner.

Optionally, peening of the weld can be performed as part of the post weld cleaning process. Peening tends to reduce stress concentration at weld joints. Peening causes the weld joint to stretch as it undergoes cooling which tends to relieve internal stress. This is understood to occur by increasing the surface area and compressive stress on the weld and it may also help mitigate surface defects such as inclusion of slag. Peening may also compensate for misalignment of the two terminal ends of the flexible screen material during welding.

Lastly, the completed screen frame is transferred to the unloading position where it can be removed to pass to other processing procedures in the manufacturing process. Similar to the loading position, the unloading position may include rectilinearly arranged magnets which are either permanent magnets or electromagnets according to an example embodiment.

The processor further includes a screen frame transfer mechanism. The screen frame transfer mechanism includes multiple rows of screen frame grippers. The screen frame grippers are arranged in multiple rows and reciprocate between the rows of screen frame positions. The number of rows of screen frame grippers is typically one less than the number of screen frame positions on the processor. The screen frame grippers may include claws that are opened and closed by electromechanical, pneumatic or hydraulic actuators. If present, the claws are configured to grip and release the screen frame material and may be adjustable or adaptable to accommodate difference sizes of screen frame material. The screen frame grippers may also include permanent or electromagnets. Mechanical grippers and magnetic grippers may be utilized independently of each other or in combination to facilitate frame transfer.

Screen frame grippers may be arranged to move in unison or in a ganged fashion so as to transport a first screen frame from the first position to a second position at the same time that a second screen frame is transported from the second position to the third position and third screen frame is transported from the third position to a fourth position and so on.

According to an example embodiment, the screen frame grippers are each configured to open and close in a manner similar to that of a clamshell bucket. When in a closed orientation two gripper jaws engage with the screen frame material. When in an open orientation the gripper jaws are retracted above the location of the screen frame material so that, in the case of the dynamic gripper jaws, the jaws pass over the top of the screen frame material with some clearance. In the case of the static gripper jaws, when the static gripper jaws are in the open position a screen frame supported by the dynamic gripper jaws pass beneath the static gripper draws without contact. According to an example embodiment, the gripper jaws are formed of a material such as nylon so as to mitigate damage to the polymer coating of the screen frame material during handling.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
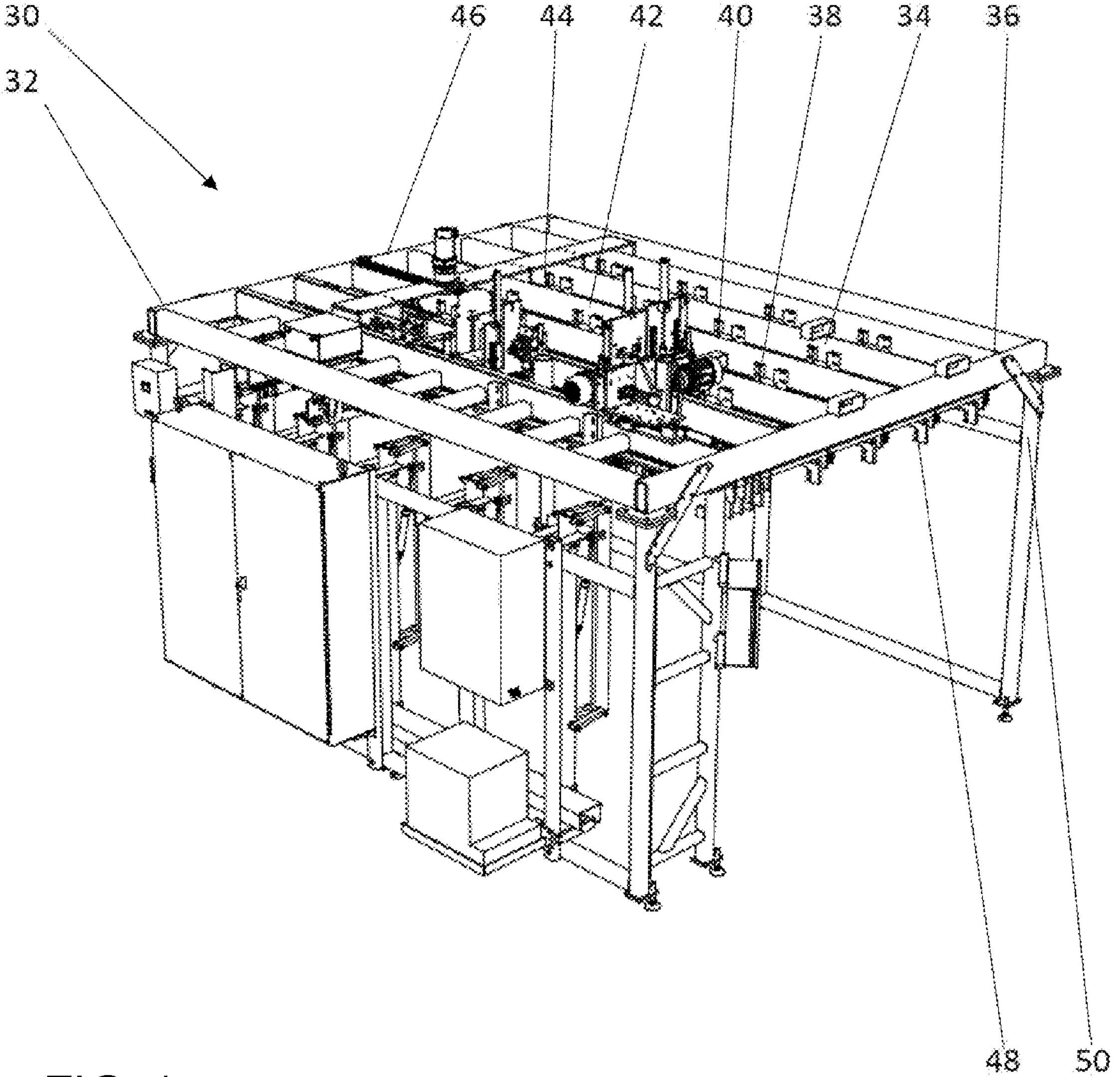
FIG. 1 is a perspective view of a screen frame welder according to an example embodiment of the invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Figure 2:
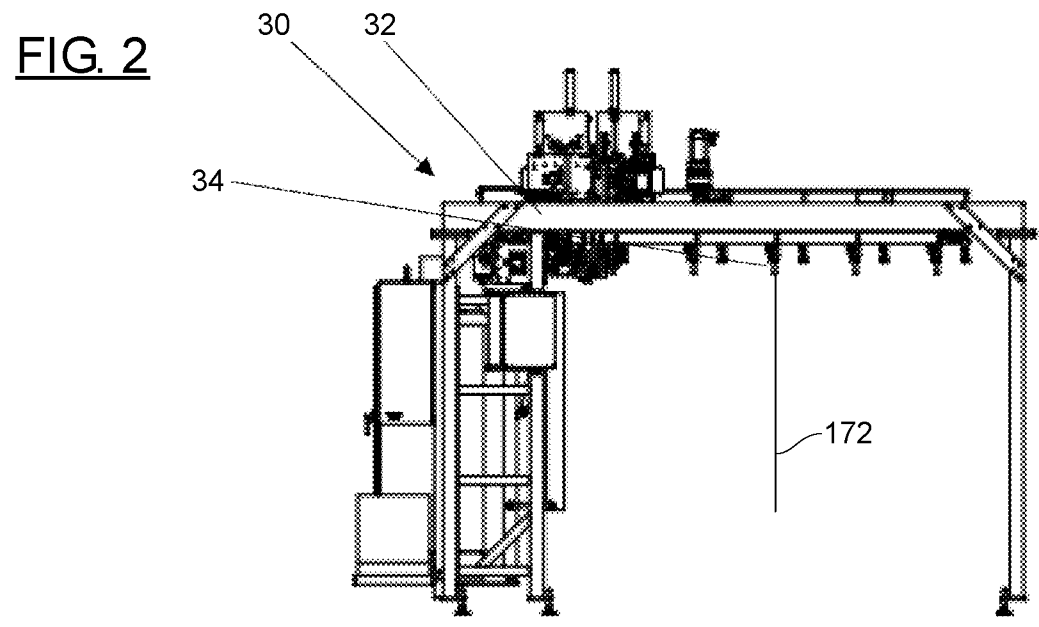
FIG. 2 is an elevational view of the screen frame welder of FIG. 1.
Figure 3:
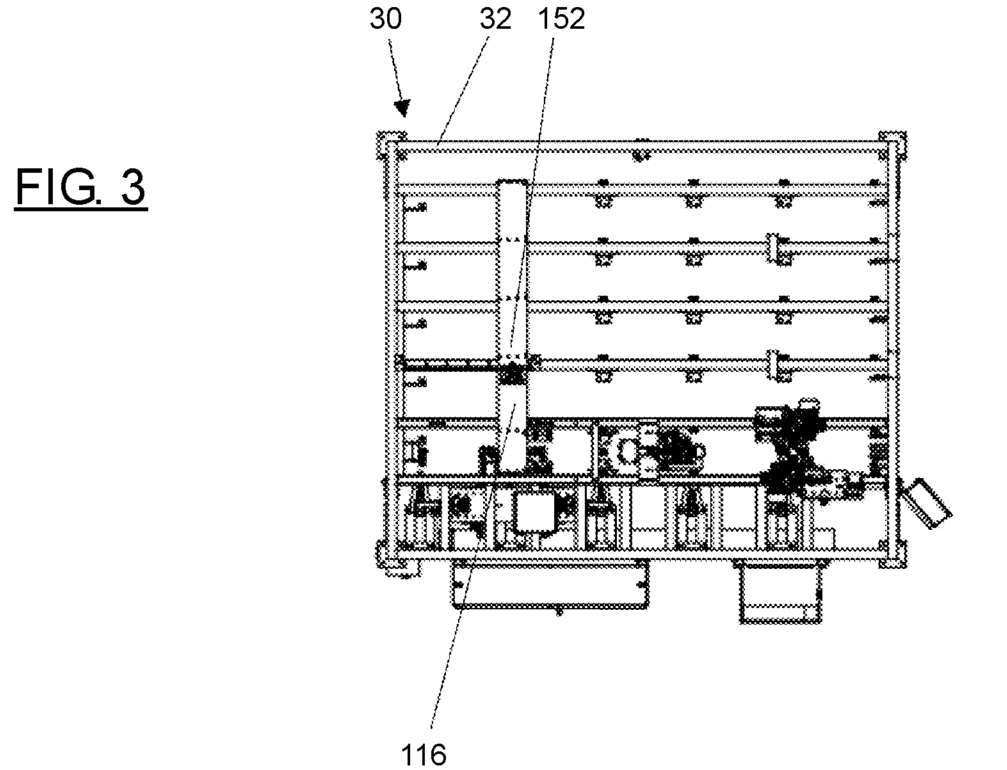
FIG. 3 is a plan view of the screen frame welder of FIG. 1.
Figure 4:
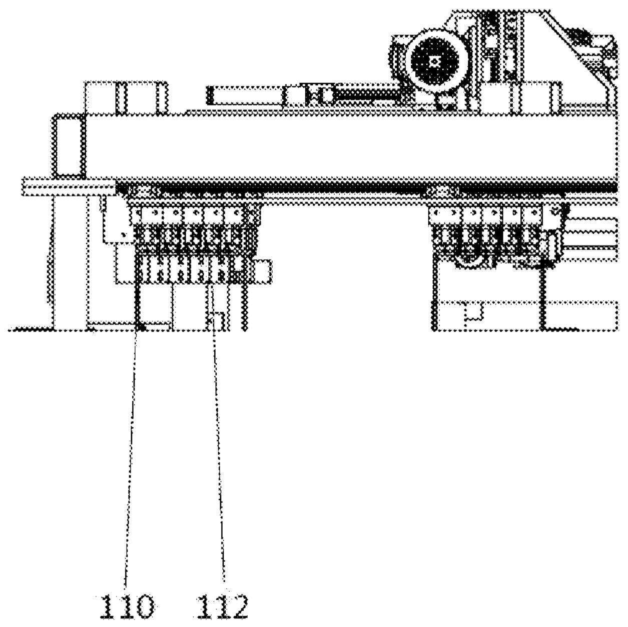
FIG. 4 is a perspective view of a screen frame transport structure transporting to screen frames in a first position according to an example embodiment of the invention.
Figure 5:
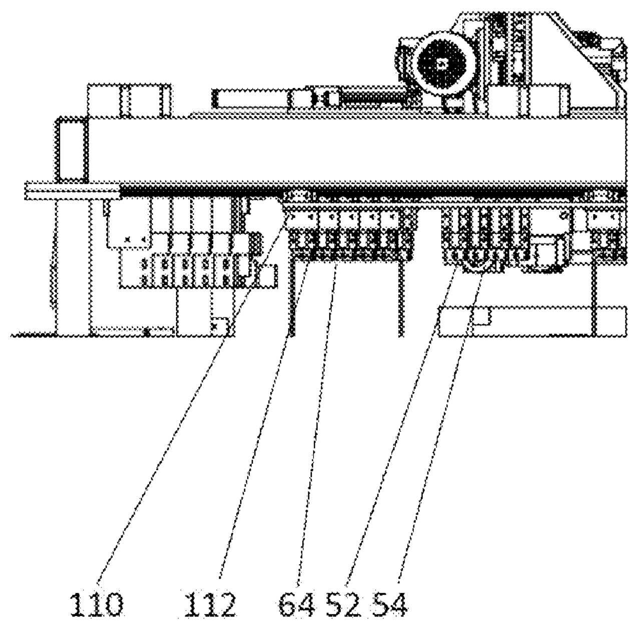
FIG. 5 is a perspective view of the screen frame transport structure transporting to screen frames in a second position.
Figure 6:
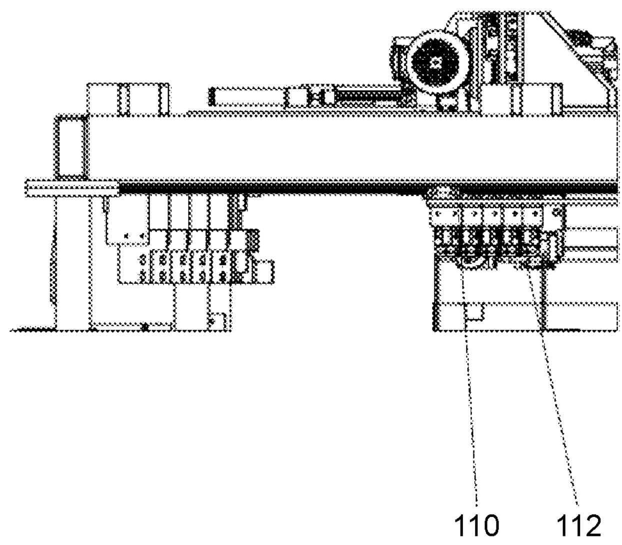
FIG. 6 is a perspective view of the screen frame transport structure transporting a screen frame in third position.
Figure 7:
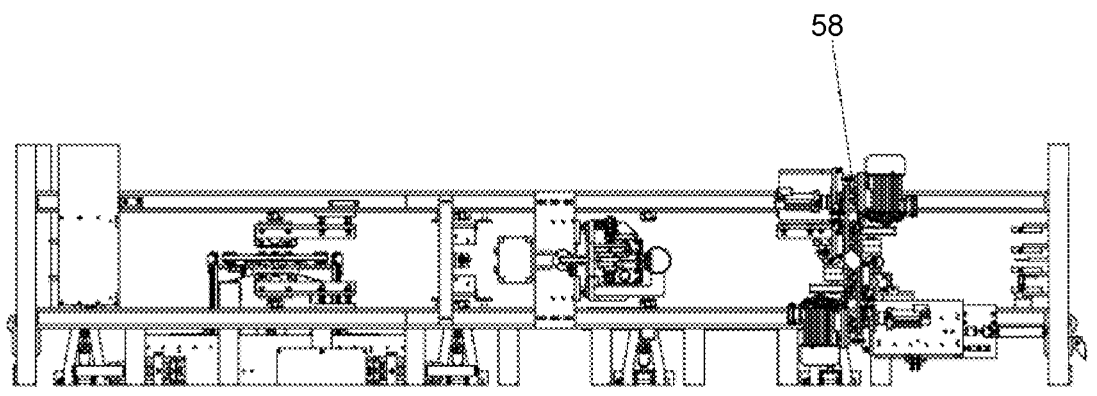
FIG. 7 is a top plan view of a portion of a screen frame welder according to an example embodiment of the invention identifying six processing positions.

Referring to FIGS. 1-3, according to an example embodiment, screen frame welder 30 generally includes supporting structure 32 having a number of frame hanging positions 34. According to the depicted example embodiment frame hanging positions 34 generally include loading position 36, cleaning and stripping frame ends position 38, resistance welding position 40, cooling position 42, post-welding cleaning position 44 and unloading position 46.

Loading position 36 generally presents magnetic supports 48 and may include light curtain 50. Magnetic supports 48 are arranged rectilinealy and generally include a sufficient number and strength of magnets to support the largest size screen frame expected to be welded. Light curtain 50 is optional but if present is coupled to moving parts of screen frame welder 30 and disables movement of those parts when light curtain 50 is interrupted.

Cleaning and stripping frame ends position 38 generally includes static grippers 52 which may include end displacing grippers 54, at least one polymer coating stripper 56 and at least one vacuum shroud 58. Polymer coating stripper 56 is movable to be alignable axially with end displacing grippers 54 and to be moved along an axis parallel to end displacing grippers 54. Polymer coating stripper 56 is also movable to be retracted away from end displacing grippers 54. According to one example embodiment, vacuum shroud 58 is positioned to at least partially surround polymer coating stripper 56 and may optionally be movable therewith.

Resistance welding position 40 generally includes static grippers 60 and resistance welder 62. Resistance welder 62 generally includes a movable gripper 64, welder static grippers 66, welder vertical movement track 68, power source 70 and cables 72.

Movable grippers 64 generally include conductive jaws 74 and nonconductive jaws 76. Movable grippers 64 are movable in a horizontal abutment direction to be farther apart and closer together axially. Movable grippers 64 are also movable to open and close their grip and movable in a vertical direction. Generally, conductive jaws 74 are movable relative to nonconductive jaws 76 which remain stationary. However, one skilled in the art will recognize that this relationship can be reversed. Power source 70 is operably electrically coupled to conductive jaws 74 by cables 72. Power source 70 is a known welding power source for resistance welding and need not be further described here.

Conductive jaws 74 and nonconductive jaws 76 are configured to grip flexible screen frame material. Resistance welder 62 may be movable in a vertical direction to shift it upwardly and clear of a welding orientation as needed to permit passage of screen frame material to and from resistance welding position 40. Conductive jaws 74 and nonconductive jaws 76, when in a closed orientation, are axially aligned.

Cooling position 42 presents cooling static grippers 78 and vortex tube 80. Vortex tube 80 is appropriately coupled to a source of compressed air to provide cooling airflow. Cooling airflow may be provided from another source as well such as electric fans.

Post weld cleaning position 44 generally includes cleaning static grippers 82 and abrasive cleaners 84. According to an example embodiment of the invention, abrasive cleaners 84 may include belt sander 86 operably coupled to horizontal actuator 88 and vertical actuator 90. Belt sander 86 may include three supporting wheels 92. Supporting wheels 92, in the depicted embodiment, are arranged in an elongate triangle. Supporting wheels 92 include two idler wheels 94 and drive wheel 96. In the depicted embodiment, drive wheel 96 is located remotely from cleaning static grippers 82 while nose idler wheel 98 is located proximate cleaning static grippers 82. Intermediate idler wheel 100 is located between and offset from drive wheel 96 and nose idler wheel 98.

In the depicted embodiment, two belt sanders 86 are present. Each of belt sanders 86 is supported on supporting plate 102. Each supporting plate 102 is mounted on movable supporting members 104 on which each of supporting plate 102 is movable in an X and Y direction. Nose idler wheel 98 and sanding belt 108 supported thereon is thus capable of moving around and making contact with flexible screen frame material on all sides of the welded portion thereof. Belts sanders 86 are in an example embodiment, oriented so that sanding belt 108 travels approximately perpendicular to the orientation of flexible screen frame material supported by cleaning static grippers 82.

In the depicted example embodiment, intermediate idler wheel 100 is supported on sanding belt tensioner 106. Sanding belt tensioner 106 is biased to maintain a desired tension on sanding belt 108.

Referring particularly to FIGS. 4, 5, 6, 18 and 19 screen frame welder 30 further includes screen frame transporter 110. In the depicted embodiment, screen frame transporter 110 includes five rows 112 of movable frame grippers 64. Five rows 112 of movable grippers 64 are spacer evenly apart by a distance substantially equal to spacing of frame hanging positions 34. Five rows 112 of movable grippers 64 are supported by movable couplers 114. In an example embodiment, movable couplers 114 are generally perpendicular to rows 112 of movable grippers 64. Movable couplers 114 are operable coupled to reciprocating drive 116. Reciprocating drive 116 may include a walking beam according to one example embodiment.

Referring particularly to FIGS. 8-10 and FIG. 14, polymer coating stripper 56, according to one example embodiment includes rotary mechanical stripper 118. According to another example embodiment, polymer coating stripper 56 includes induction stripper 120.

Figure 8:
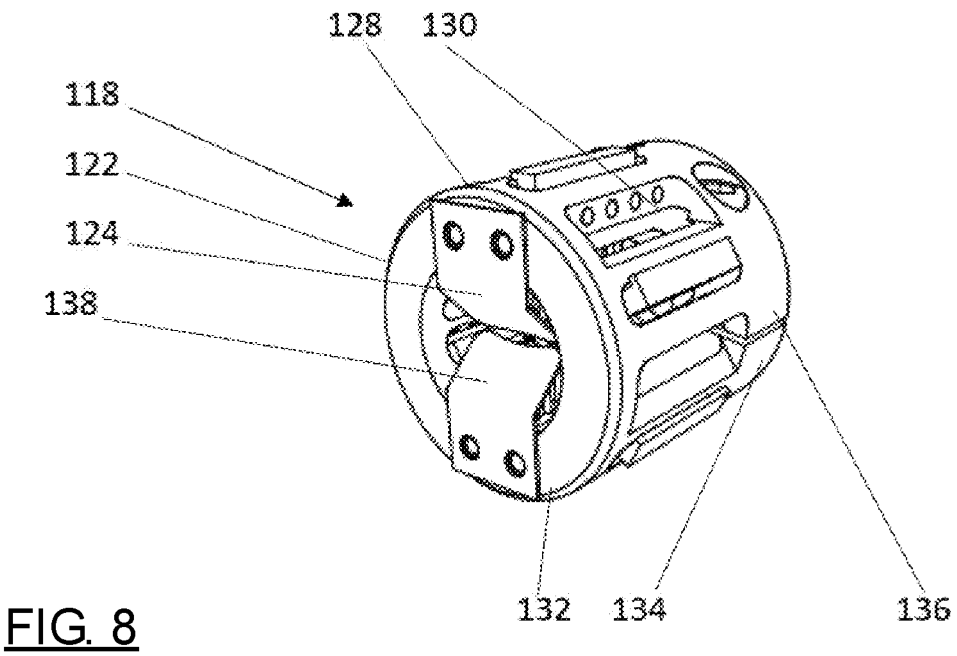
FIG. 8 is a perspective view of a screen frame material polymer coating stripper according to an example embodiment of the invention.
Figure 9:
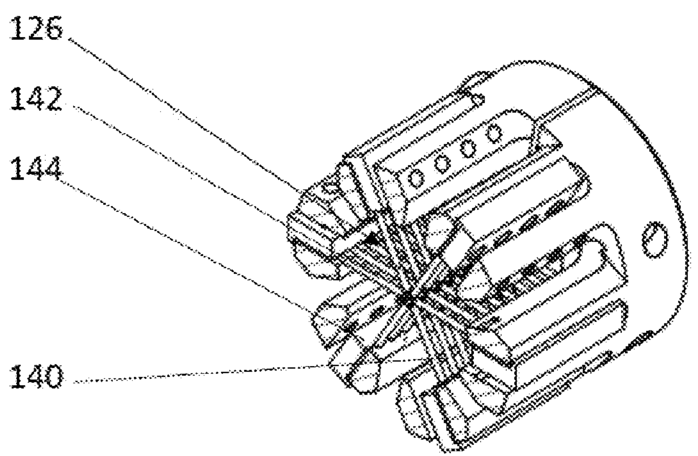
FIG. 9 is a cut away perspective view of the screen frame polymer coating stripper depicted in FIG. 8.
Figure 10:
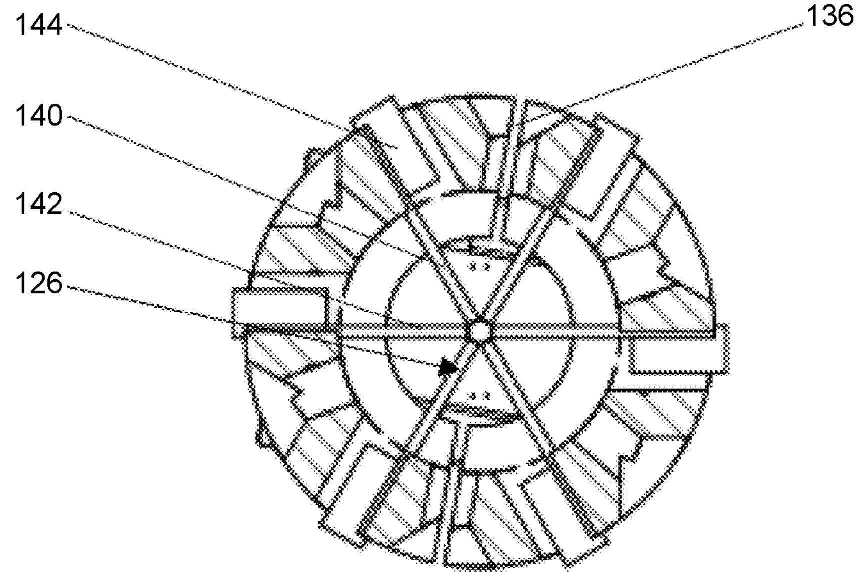
FIG. 10 is a cut away elevational view of the screen frame polymer coating stripper depicted in FIG. 8.
Figure 11:
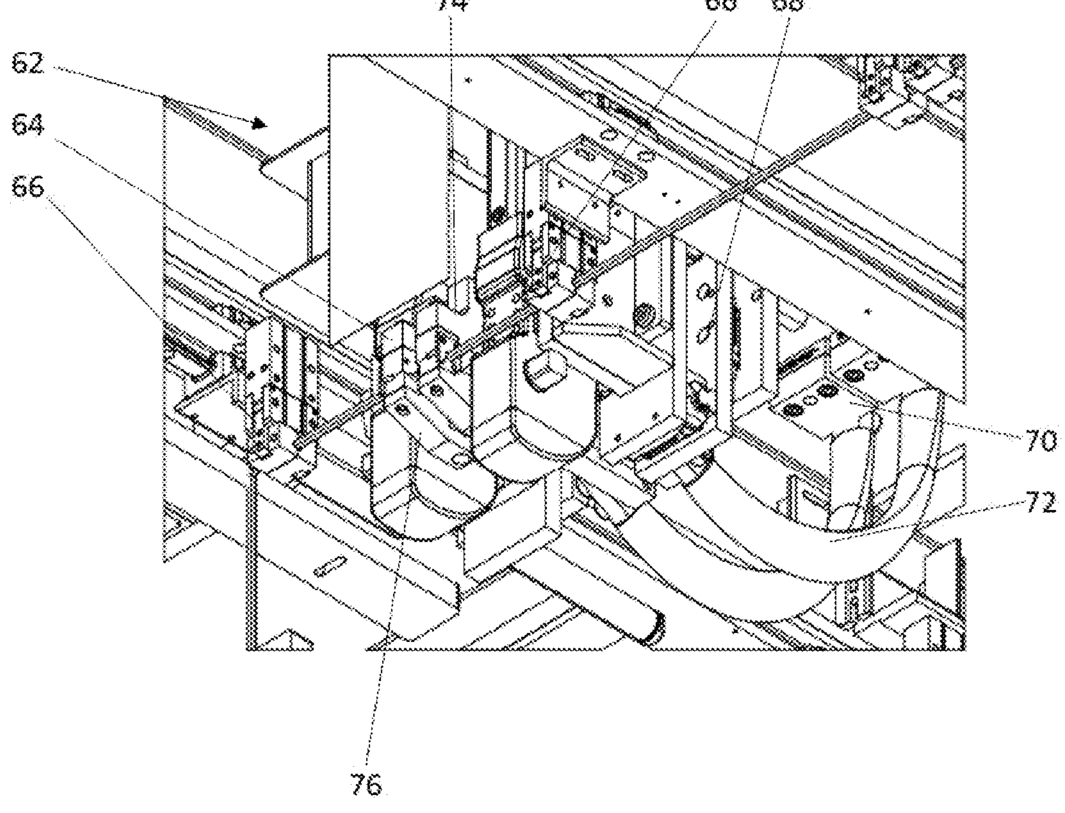
FIG. 11 is a bottom perspective view of a resistance welder and surrounding structures according to an example embodiment of the invention.
Figure 12:
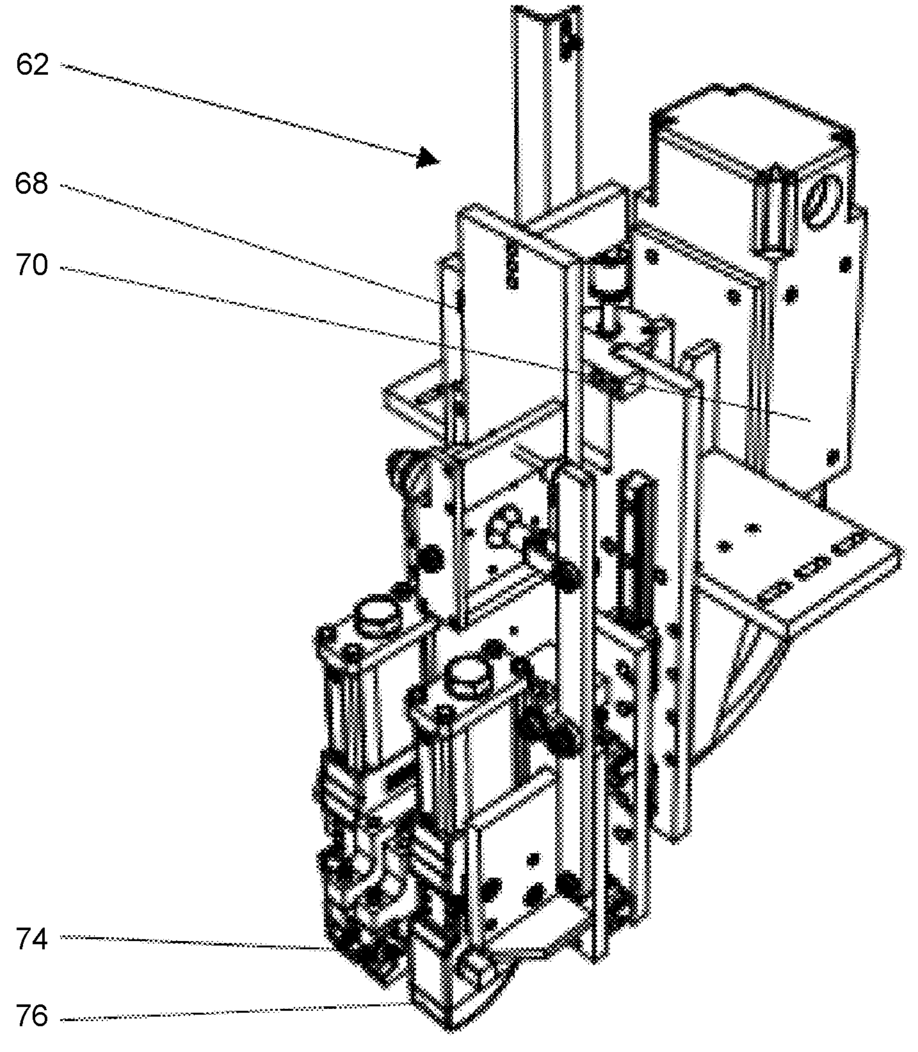
FIG. 12 is a perspective view of the resistance welder in isolation.
Figure 13:
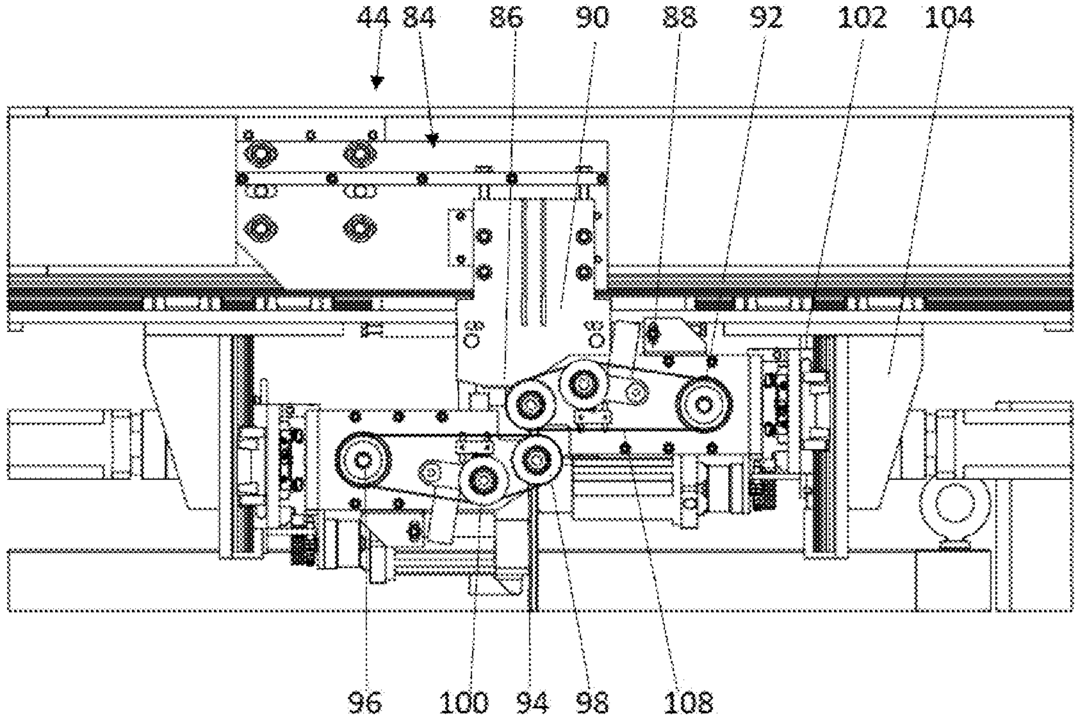
FIG. 13 is an elevational view of a flash and weld spatter remover according to an example embodiment of the invention.

Referring particularly to FIGS. 8-10, rotary mechanical stripper 118 includes cup 122, scoring portion 124 and polymer stripping portion 126. Cup 122 generally includes cylindrical external structure 128 perforated by a number of openings 130 through which stripped plastic can exit cup 122. Cup 122 generally includes distal end 132 having a fixed diameter opening and a proximal end 134 having an opening that can be reduced in size by a clamping member 136 to secure it to a spindle. The proximal end 134 opening can be structured to be reduced in diameter to grip the spindle or can for example be threaded to be secured on a threaded spindle. Other approaches to securing cup to the spindle may be utilized as well as known by those skilled in the art.

Scoring portion 124 generally includes two or more scoring blades 138 secured to cup 122 at distal end 132.

Stripping portion includes abrading structures 140 including for example spring steel wires or rods 142. Spring steel wires or rods 142 are coupled to cup 122 by clamps 144 or other structures known to those skilled in the art.

Figure 14:
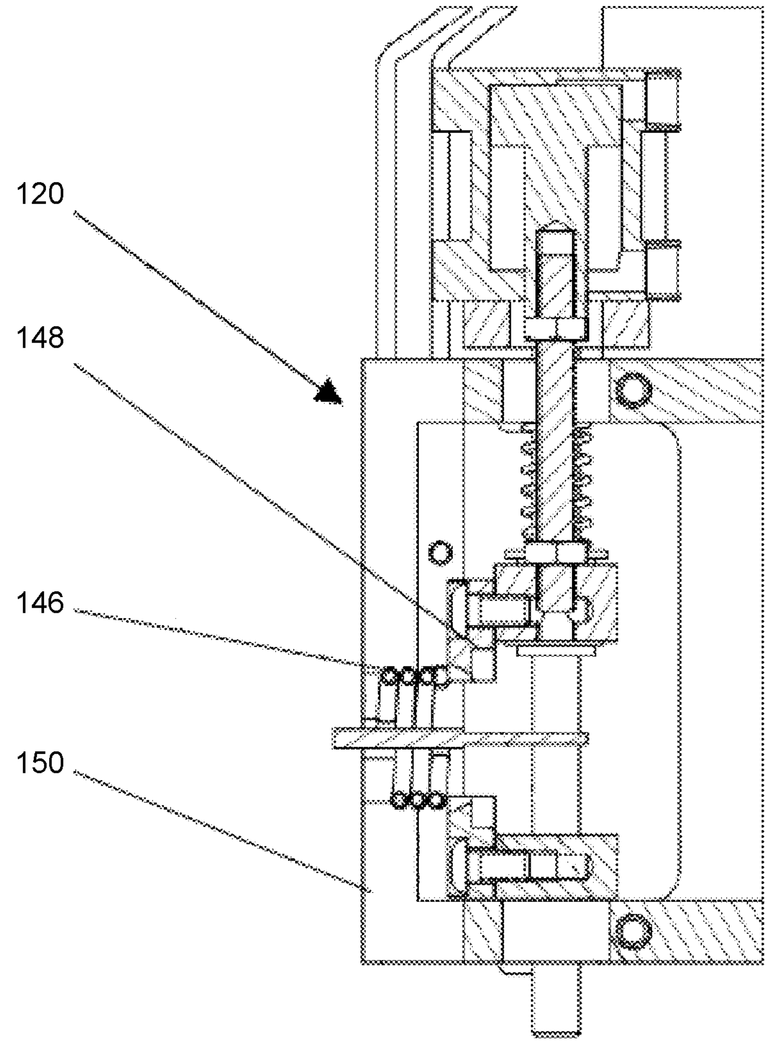
FIG. 14 is a cut away view of the screen frame polymer coating stripper utilizing induction heating.

Referring to FIG. 14 induction stripper 120 generally includes induction heating coil 146, stripping jaws 148 and supporting structure 150. Stripping jaws 148 may conform to the outer contour of the metal core of frame material processed and are shiftable between an open orientation and a closed orientation. Supporting structure 150 supports stripping jaws 148 and induction heating coil 146 and may be movable or stationary. Induction heating coil 146 is of a size to readily receive an end of frame material and of sufficient energy to heat the frame material core to soften a polymer coating in a few seconds.

Figure 18:
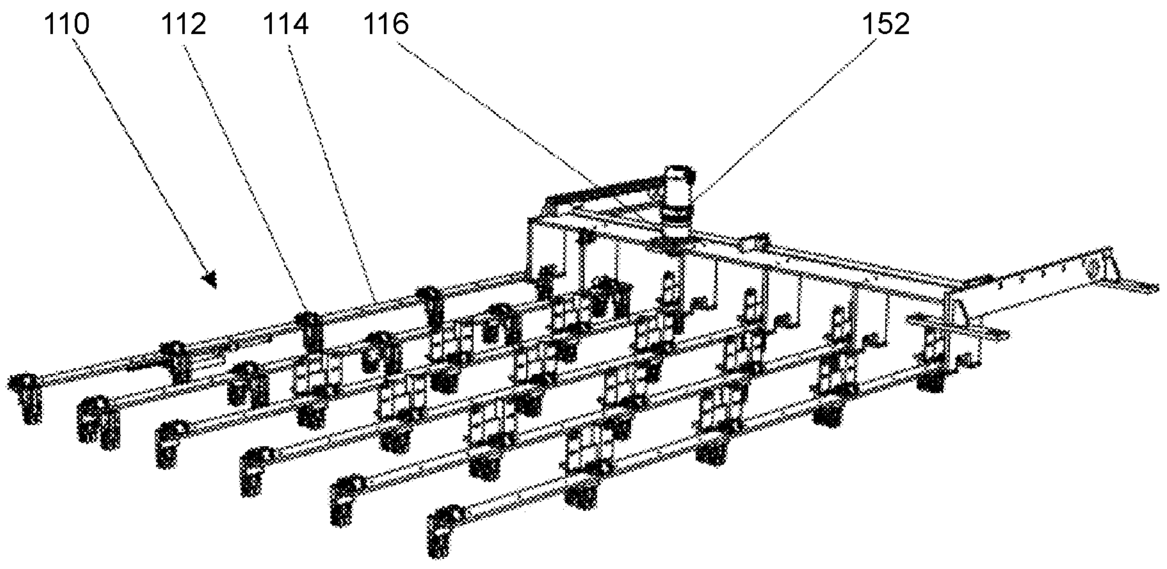
FIG. 18 is a perspective view of a walking beam assembly in isolation according to an example embodiment of the invention.
Figure 19:
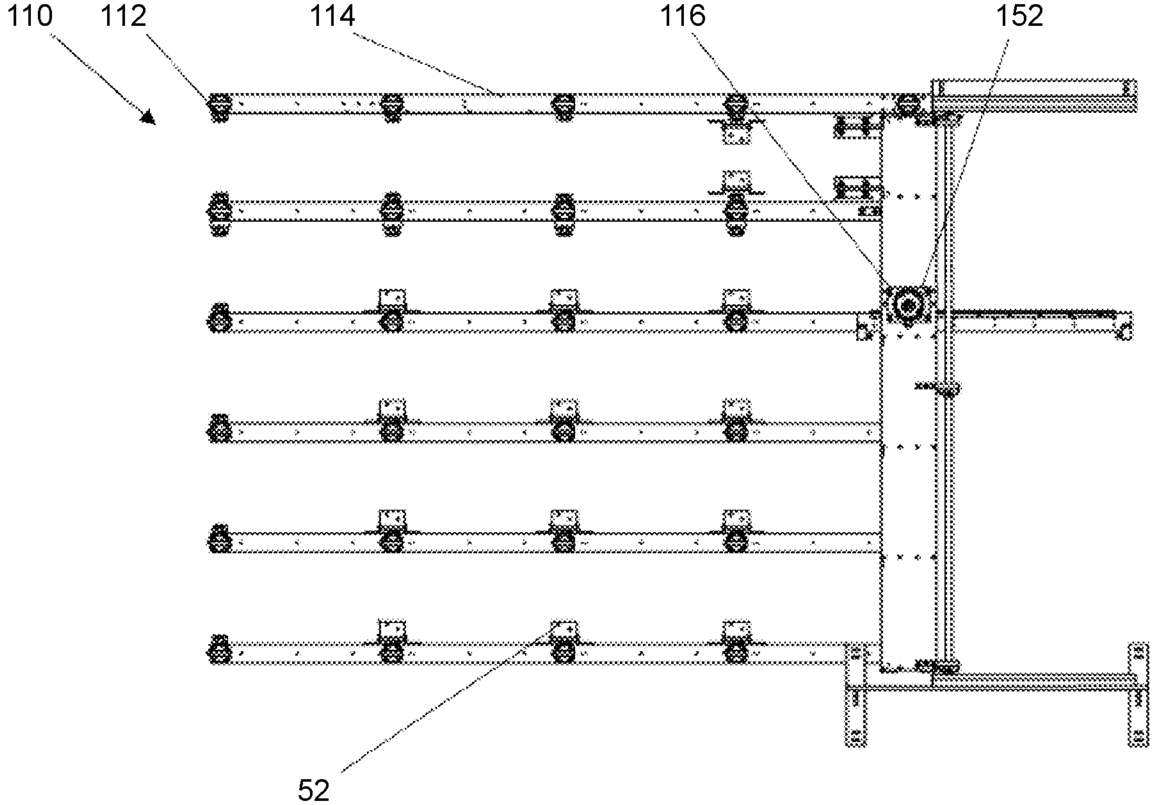
FIG. 19 is a plan view of the walking beam assembly depicted in FIG. 18 in isolation.

FIGS. 18 and 19 depict screen frame transporter 110 in isolation. Movable couplers 114 are linked and operably coupled to walking beam drive 152. Walking beam drive 152 is coupled to and supported by supporting structure32.

Figures 15, 16:
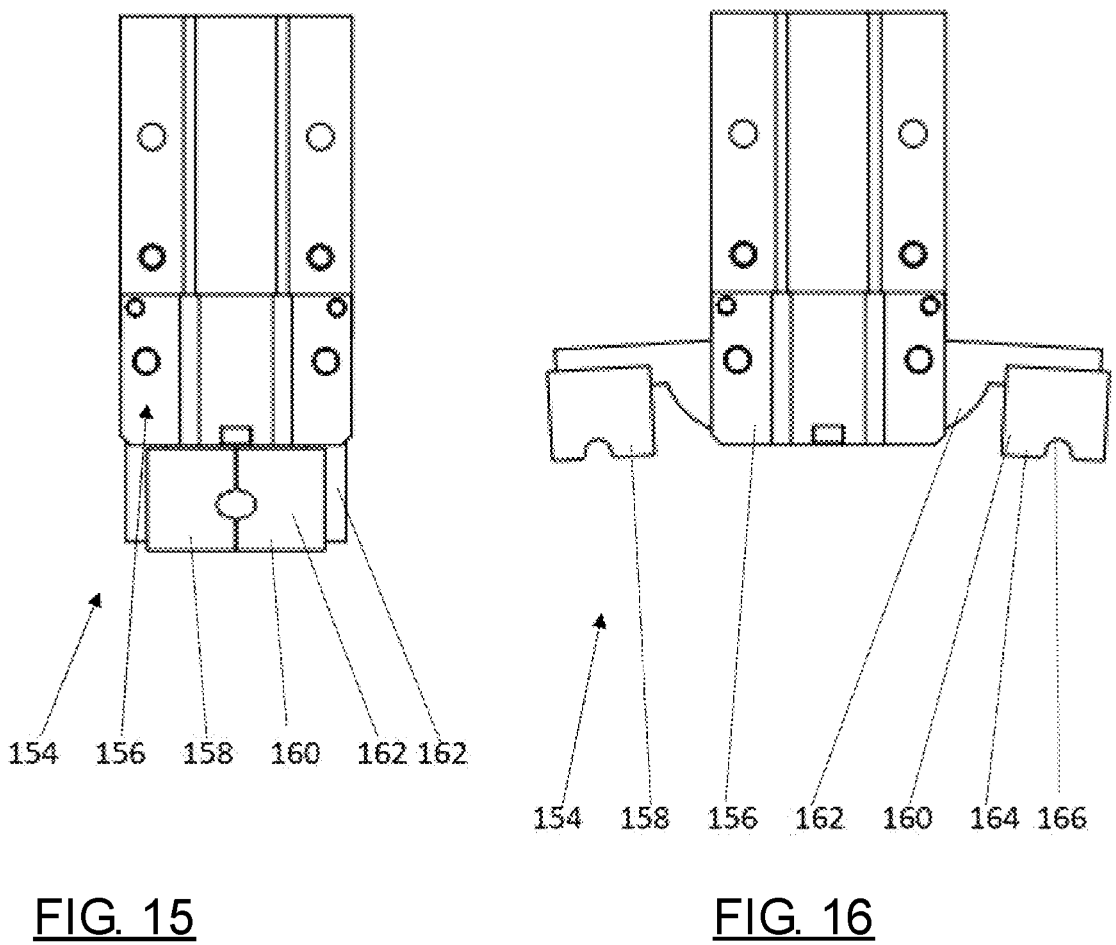
FIG. 15 is an elevational view of a screen frame gripper according to an example embodiment in a closed orientation.
FIG. 16 is an elevational view of a screen frame gripper of FIG. 15 in an open orientation.

Referring to figures FIGS. 15 and 16 an example of static gripper 60 and movable gripper 62 is depicted. FIG. 15 depicts gripper 154 in a closed orientation. FIG. 16 depicts gripper 154 in an open orientation. It is notable that gripper 154 when in the open orientation completely clears the area below it so that it does not interfere with the passage of screen frame material. Gripper 154 generally includes jaw support 156, first jaw 158, and second jaw 160. First jaw 158, and second jaw 160 are generally mirror images of each other in structure and movement. Each of first jaw 158, and second jaw 160 includes swingarm 162 and gripping block 164. Swingarms 162 are rotatably coupled to just support 156. Each of gripping block 164 defines cut out 166 which is sized to receive expected screen frame material therein. Each of first jaw 158, and second jaw 160 is structured to swing approximately ninety degrees when shifting between the open orientation and the closed orientation.

Figure 17:
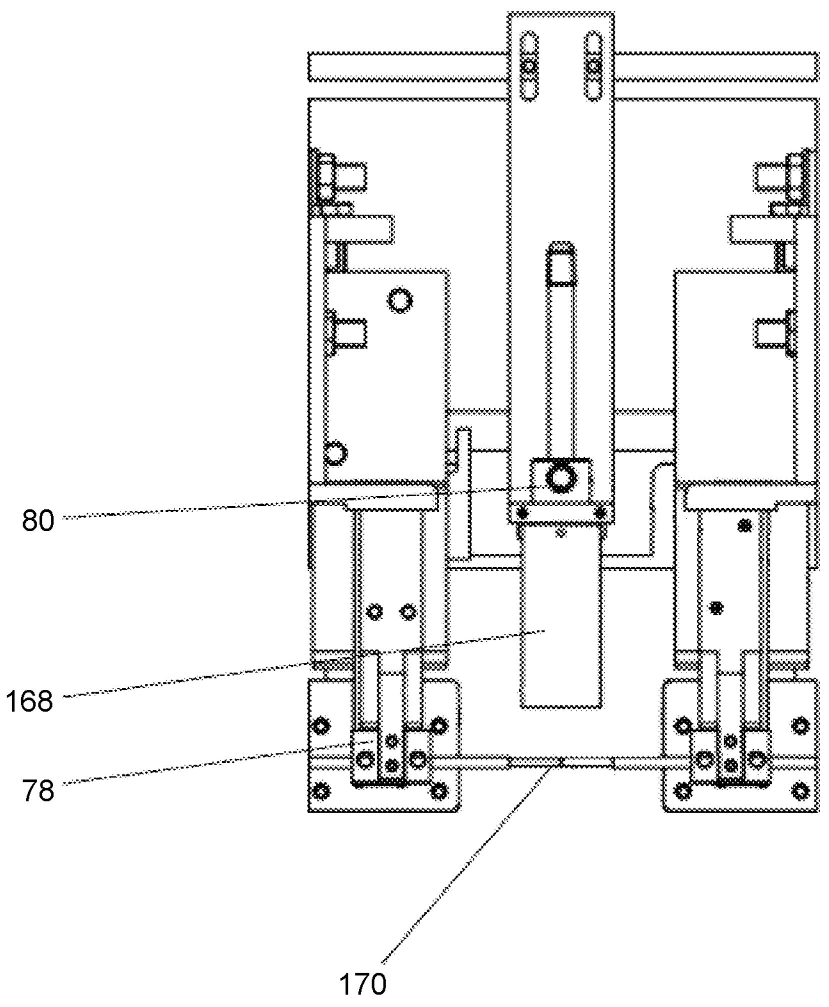
FIG. 17 is an elevational view of a cooling air source and vortex tube according to an example embodiment.

Referring to FIG. 17, a portion of cooling position 42 including vortex tube 80 and cooling air source 168 is depicted. As can be seen, airflow from cooling air source 168 is directed toward welded joint to 170 of screen frame 172. Static grippers 60 can be support can be seen supporting screen frame 172 with a weld the joint 170 proximate cooling air source 168.

Referring to FIGS. 20, 21, 22, 23 and 24 according to an alternative embodiment post weld cleaning structure 44 may be replaced by peening or coining structure 174.

In an example embodiment, peening or coining structure 174. Included peening blocks 176. Each of peening blocks 176, in the depicted embodiment includes metallic body 178 presenting mating surfaces 180 and defining receiving cavity 182. Metallic body 178 is generally formed of a hard metallic material that is durable in response to impact or pressure. Mating surfaces 180 can be formed in other shapes that allow the two blocks to meet in close apposition. Receiving grooves 182 are sized and shaped to receive screen frame material therein and to closely conform to the outer surface shape of screen frame material that is utilized. Peening blocks 176 are operably coupled to peening drive 184 which mates peening blocks 176 with each other with screen frame material therebetween under impact or pressure or both by the application of, for example, pneumatic or hydraulic forces.

According to an example embodiment, peening or coining structure 174 generally includes peening blocks 176, fixed jaw 186, movable jaw 188, slide rails 190, hydraulic actuator 192, guide structure 194, slide block 196 and retaining pins 198. Fixed jaw 186 is fixedly secured to slide rails 190 while movable jaw 188 is slidably coupled to slide rails 190 via slide block 196.

Peening blocks 176 are secured respectively to fixed jaw 186 and movable jaw 188. Each of retaining pins 198 is retractably coupled to one of fixed jaw 186 and movable jaw 188. Each of retaining pins 198 is biased toward peening blocks 176 thereby securing peening blocks 176 until retaining pins 198 are retracted.

Hydraulic actuator 192 is coupled to slide block 196.

Guide structure 194 is shaped and positioned to facilitate guiding screen frame material at a weld joint to an appropriate position relative to peening blocks 176 for peening.

Figure 20:
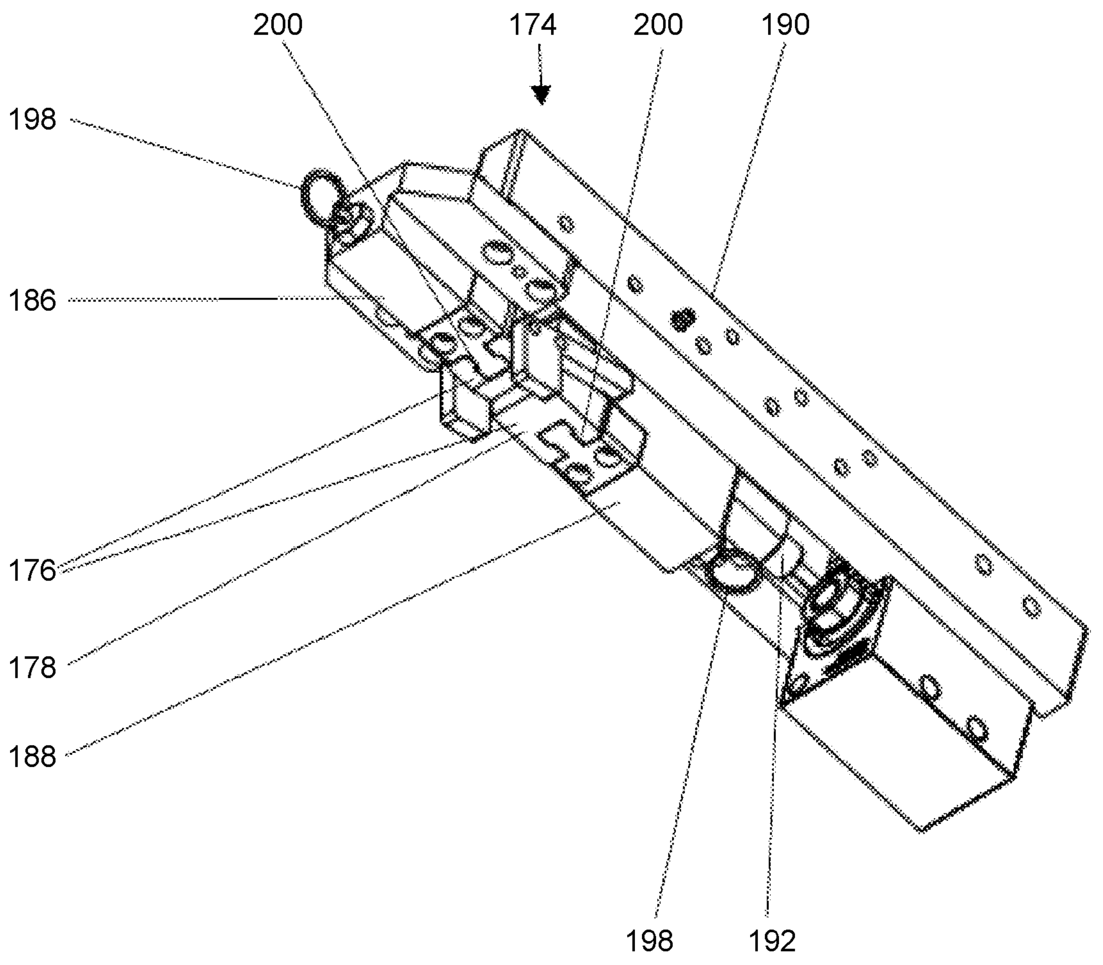
FIG. 20 is a perspective view of a peening or coining structure according to an example embodiment of the invention.
Figure 21:
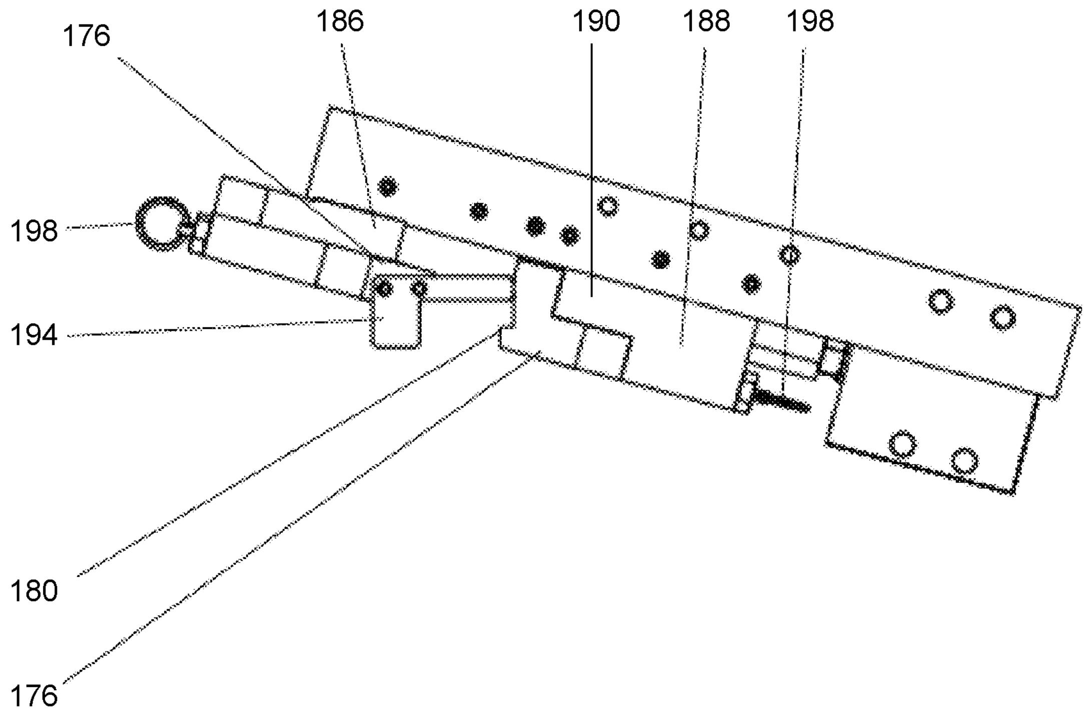
FIG. 21 is an elevational view of the peening or coining structure depicted in FIG. 20 with jaws in an open orientation.
Figure 22:
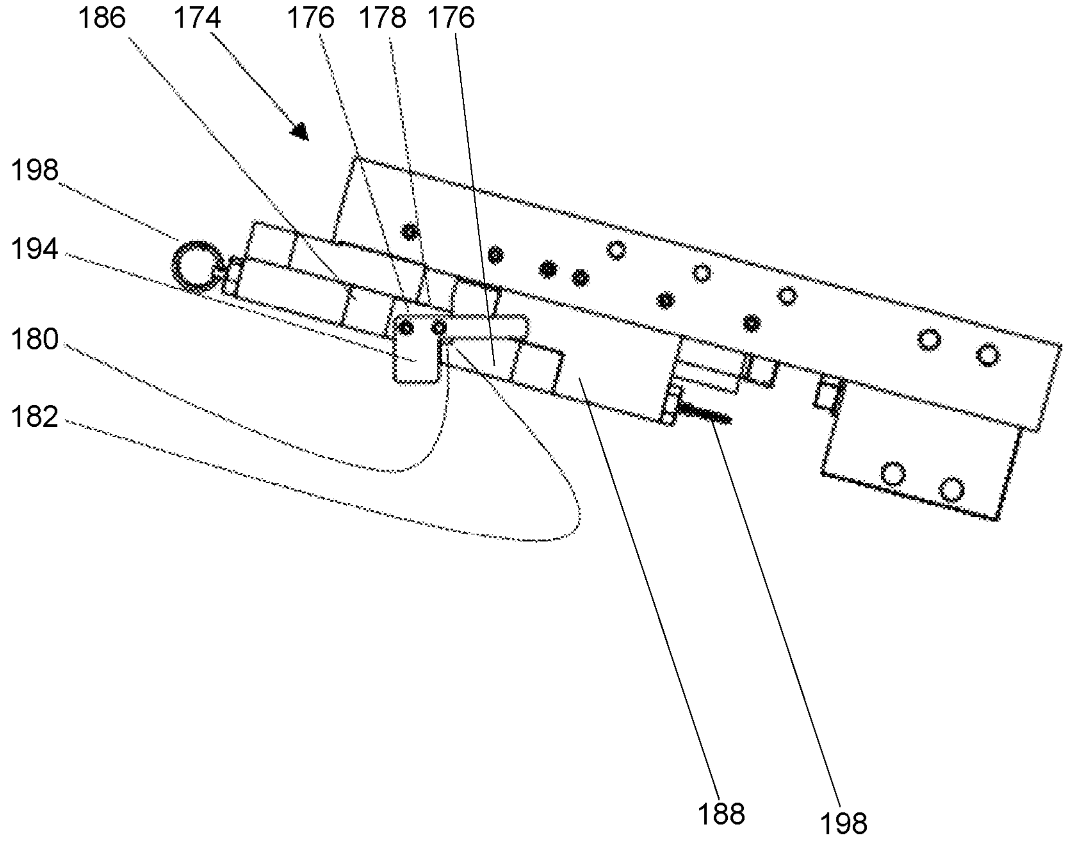
FIG. 22 is an elevational view of the peening or coining structure depicted in FIG. 21 with jaws in a closed orientation.
Figure 23:
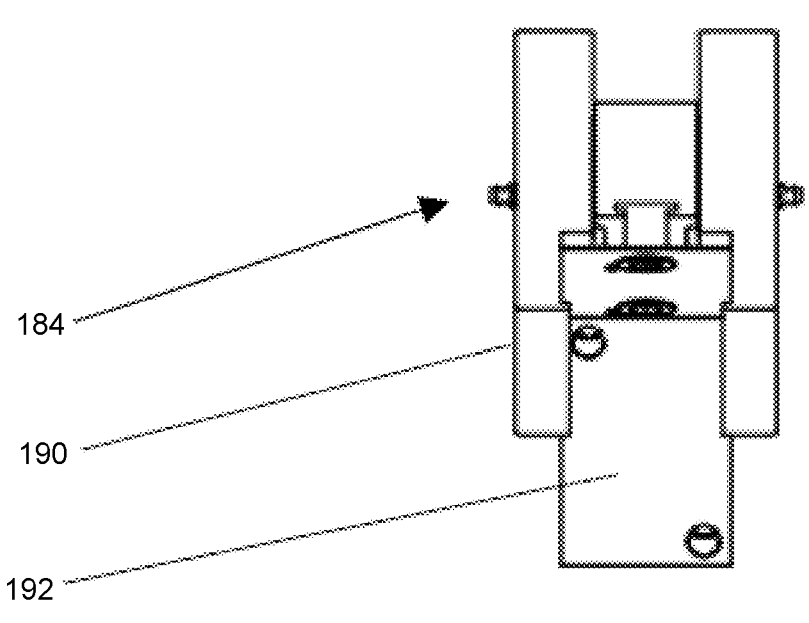
FIG. 23 is an end perspective view of the peening or coining structure according to the example embodiment depicted in FIG. 20.
Figure 24:
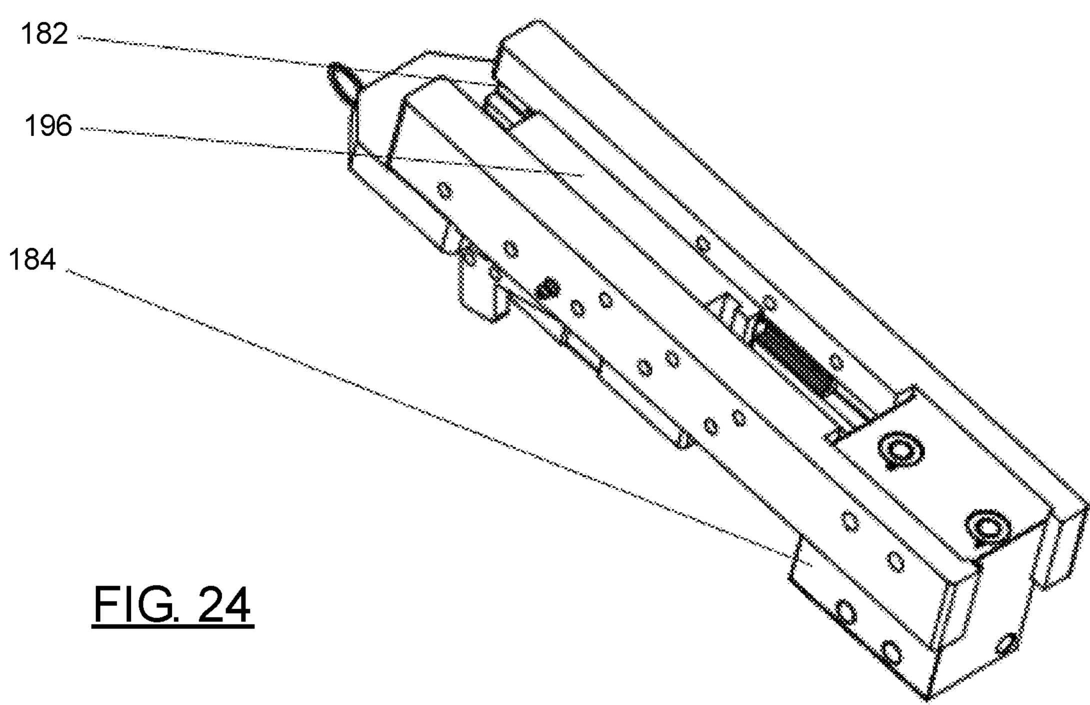
FIG. 24 is another perspective view of the peening or coining structure.

With particular reference to FIGS. 20, 21 and 22, in the depicted embodiment guide structure 194 is generally L-shaped and is secured to fixed jaw 186.

Referring particularly to FIG. 20, peening blocks 176 may be mated to fixed jaw 186 and movable jaw 188 by interlocking key structures 200.

In operation, an operator places partially completed screen frame 172 at loading position 36 of screen frame welder 30. During placement of screen frame 172 the operator disrupts light curtain 50 which immobilizes the operation of moving parts of screen fame welder 30. Screen frame 172 is then supported by magnetic supports 48 at loading position 36. Screen frame transporter 110 travels toward loading position 48. First jaw 158 and second jaw 160 of movable gripper 64 pass over the top of screen frame 172 in an open position. First jaw 158 and second jaw 160 then shift to a closed position by operation of swing arms 162. Cut outs 166 of gripping blocks 164 grip screen frame 172. Screen frame transporter 110 then shifts toward cleaning and stripping frame ends position 38. At cleaning and stripping frame ends position 38 static screen frame transporter 110 displaces frame ends to provide access to either mechanical stripper 118 or induction stripper 120. Once frame ends are cleaned and stripped, static grippers 52 grip screen frame 172. According to an example embodiment, screen frame transporter 110 returns displaced frame ends to axial alignment prior to static grippers 52 gripping screen frame 172.

Either rotary mechanical stripper 118 or induction stripper 120 or another stripper is used to remove vinyl coating from the screen frame material at this location. In the case of rotary mechanical stripper 118, rotary mechanical stripper 118 is advanced over the screen frame end while in rotary motion. In the case of induction stripper 120 screen frame and is inserted within inductive heating coil 146 while electrical energy is applied to inductive heating coil 146 thus heating the metallic core of the screen frame material and softening the polymer coating. Stripping jaws 148 are then brought together to grip the screen frame material therebetween. Stripping jaws 148 that are retracted away from screen frame material or screen frame material is withdrawn through stripping jaws 148 thus removing the polymer coating.

Screen frame transporter 110 in an ensuing cycle transports screen frame 172 to resistance welding position 40. At resistance welding position 40 resistance welder 62 engages location of welded joint 170 so that the screen frame ends are axially aligned. Conductive jaws 74 and nonconductive jaws 76 are moved to bring scream frame ends into abutment. Resistance welder 62 applies electrical energy to achieve fusion and welding of screen frame ends at welded joint 170. Once well the joint 170 is achieved conductive jaws 74 and nonconductive just 76 release and resistance well there 62 is retracted upwardly by welder vertical movement track 68.

Screen frame transporter 110 in an ensuing cycle transport screen frame 172 to cooling position 42. Cooling static gripper 78 grip screen frame 172 and vortex tube 80 and cooling air source 168 direct cooling air at welded joint 170 to dissipate heat.

Screen frame transporter 110 then transfers screen frame 172 to post weld cleaning position 44 or peening or coining structure 174. In the case of post weld cleaning position 44 screen frame 172 is gripped by cleaning static grippers 82 and abrasive cleaner 84 in the form of belt sander 86 moves about welded joint 170 to remove any mushrooming, weld spatter or flash.

In the case of peening or coining structure 174, weld joint 170 is positioned in receiving grooves 182 after which peening drive 184 which mates peening blocks 176 with each other with screen frame material therebetween under impact or pressure or both by the application of, for example, pneumatic or hydraulic forces. This reduces mushrooming, weld/or spatter thereby providing a smooth weld joint 170.

Guide structure 194 guides well joint 170 into receiving grooves 182.

Screen frame transporter 110 then transfers screen frame 172 to unloading position 46 where screen frame 172 is supported for example by magnetic supports 48 for removal by an operator.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A flexible screen frame processor, comprising:

a loading position including loading screen frame supports at which a partially formed flexible screen frame is supportable by an upper perimeter of the partially formed flexible screen frame;

an end stripping position including at least one polymer coating stripper;

a welding position including a welder and screen frame supports that support mating ends of the screen frame coaxially aligned;

a post welding position including structures that further process a welded joint to mitigate features of the welded joint including mushrooming, weld spatter and weld flash; and an unloading position including unloading screen frame supports at which a welded and post-weld processed flexible screen frame is supportable by an upper perimeter of the welded flexible screen frame.

2. The flexible screen frame processor as claimed in claim 1, wherein the polymer coating stripper further comprises a rotating cup including a scoring portion extending inwardly from a distal end of the rotating cup and a plurality of abrading members extending inwardly from an interior of the rotating cup.

3. The flexible screen frame processor as claimed in claim 1, wherein the polymer coating stripper further comprises an induction heating coil and at least one movable stripping jaw having a sharp edge and being structured to grip and engage a polymer coating and to move axially relative to the flexible screen frame material.

4. The flexible screen frame processor as claimed in claim 1, wherein at least one of the loading screen frame supports and the unloading screen frame supports comprises magnets that magnetically support the screen frames.

5. The flexible screen frame processor as claimed in claim 1, wherein the welder comprises a resistance welder.

6. The flexible screen frame processor as claimed in claim 1, wherein the welder is further supported on a movable support that comprises tracks oriented vertically that facilitate retracting the welder upwardly.

7. The flexible screen frame processor as claimed in claim 1, wherein the welder further comprises jaws that grip flexible frame material and that are axially moveable toward each other to abut ends of the flexible screen frame material prior to or during resistance welding.

8. The flexible screen frame processor as claimed in claim 1, further comprising a flexible screen frame transport structure including rows of movable frame grippers coupled to a reciprocating support wherein the movable frame grippers engage and grip a flexible screen frame at a first position, transport the flexible screen frame to a second position and release the flexible screen frame at a second position.

9. The flexible screen frame processor as claimed in claim 8, wherein at least a portion of the rows of movable frame grippers retract upwardly and away from gripping the flexible screen frame and pass over the flexible screen frame without contacting the flexible screen frame when returning from the second position to the first position.

10. The flexible screen frame processor as claimed in claim 8, wherein the flexible screen frame transport structure further comprises a walking beam.

11. The flexible screen frame processor as claimed in claim 1, wherein the post welding position includes spatter and flash cleaners comprising abrasives that facilitate removal of the spatter and flash.

12. The flexible screen frame processor as claimed in claim 1, wherein the post welding position includes spatter and flash cleaners comprising belt sanders.

13. The flexible screen frame processor as claimed in claim 1, comprising the loading position, followed by the end stripping position, followed by the welding position, followed by a cooling position, followed by the post welding position and the unloading position;

wherein the post welding position further comprises a peening structure.

14. The flexible screen frame processor as claimed in claim 13, wherein the peening structure further comprises a fixed jaw and a moveable jaw each supporting a peening block.

15. The flexible screen frame processor as claimed in claim 14, wherein the peening structure further comprises slide rails upon which a slide block is moveable supported, the slide block supporting the moveable jaw.

16. The flexible screen frame processor as claimed in claim 1, further comprising a cooling position following the welding position, the cooling position including a source of cooling air directed at a welded portion of the flexible screen frame.

17. The flexible screen frame processor as claimed in claim 1, further comprising a light curtain located proximate at least one of the loading position or the unloading position.

18. The flexible screen frame processor as claimed in claim 1, wherein the post welding position further comprises peening blocks presenting mating surfaces, the mating surfaces being sized and shaped to closely conform to a shape of screen frame material that makes up the flexible screen frame.

* * * * *